US012238381B2

(12) United States Patent
Peacock et al.

(10) Patent No.: US 12,238,381 B2
(45) Date of Patent: Feb. 25, 2025

(54) METHODS AND APPARATUS FOR IMPLEMENTING DYNAMIC PROGRAM GUIDES ON MOBILE DEVICES

(71) Applicant: Adeia Media Holdings LLC, San Jose, CA (US)

(72) Inventors: Gavin Peacock, Walnut Creek, CA (US); James Roseborough, Piedmont, CA (US); David Lowell, San Francisco, CA (US); Aravind Nallan, San Jose, CA (US); Ian Farmer, Oakland, CA (US)

(73) Assignee: Adeia Media Holdings LLC, San Jose, CA (US)

( * ) Notice: Subject to any disclaimer, the term of this patent is extended or adjusted under 35 U.S.C. 154(b) by 0 days.

(21) Appl. No.: 17/729,867

(22) Filed: Apr. 26, 2022

(65) Prior Publication Data

US 2022/0360859 A1 Nov. 10, 2022

Related U.S. Application Data

(63) Continuation of application No. 15/340,917, filed on Nov. 1, 2016, now Pat. No. 11,343,581, which is a
(Continued)

(51) Int. Cl.
*H04N 21/482* (2011.01)
*H04N 7/173* (2011.01)
(Continued)

(52) U.S. Cl.
CPC ..... *H04N 21/4821* (2013.01); *H04N 7/17318* (2013.01); *H04N 21/21* (2013.01);
(Continued)

(58) Field of Classification Search
CPC .......... H04N 21/4532; H04N 21/4126; H04N 21/4622; H04N 21/4316; H04N 21/482;
(Continued)

(56) References Cited

U.S. PATENT DOCUMENTS 5,684,525 A 11/1997 Klosterman
D412,154 S 7/1999 Lok
(Continued)

OTHER PUBLICATIONS

"U.S. Appl. No. 11/542,620, Final Office Action dated Apr. 14, 2009".
(Continued)

*Primary Examiner* — Jason Salce
(74) *Attorney, Agent, or Firm* — Haley Guiliano LLP

(57) ABSTRACT

Mechanisms are provided for allowing a mobile device to dynamically obtain program guide data. A mobile device having the capability of playing media streams is configurable to dynamically request program guide structure information followed by program guide content information. In one example, the program guide structure information allows a user to begin navigating the program guide data in an active and dynamic manner. Program guide content information including data such as program titles, times, icons, and links are then downloaded and displayed as needed. Potentially limitless amounts of program guide data can be provided on a mobile device. Program guide content information can be provided in a generic manner while allowing user layout customization. Program guide information can also be preemptively provided to a mobile device based on a variety of criteria.

16 Claims, 7 Drawing Sheets

Related U.S. Application Data continuation of application No. 12/882,061, filed on Sep. 14, 2010, now Pat. No. 9,516,252, which is a continuation of application No. 11/542,620, filed on Oct. 2, 2006, now Pat. No. 7,818,769.

(51) Int. Cl.

| | | |
|---|---|---|
| *H04N 21/21* | (2011.01) | |
| *H04N 21/23* | (2011.01) | |
| *H04N 21/236* | (2011.01) | |
| *H04N 21/414* | (2011.01) | |
| *H04N 21/434* | (2011.01) | |
| *H04N 21/47* | (2011.01) | |
| *H04N 21/61* | (2011.01) | |
| *H04N 21/84* | (2011.01) | |

(52) U.S. Cl.
CPC ....... *H04N 21/23* (2013.01); *H04N 21/23614* (2013.01); *H04N 21/41407* (2013.01); *H04N 21/4348* (2013.01); *H04N 21/47* (2013.01); *H04N 21/6131* (2013.01); *H04N 21/6181* (2013.01); *H04N 21/84* (2013.01)

(58) Field of Classification Search
CPC ......... H04N 21/41407; H04N 21/4312; H04N 21/47202; H04N 21/4667; H04N 21/4722; H04N 21/478; H04N 21/6582; H04N 21/8133; H04N 21/44204; H04N 21/44222; H04N 5/4403; H04N 21/42208; H04N 21/4222

See application file for complete search history.

(56) References Cited

U.S. PATENT DOCUMENTS

| | | |
|---|---|---|
| D416,230 S | 11/1999 | Narumo et al. |
| D449,304 S | 10/2001 | Herath |
| 6,311,329 B1 | 10/2001 | Terakado et al. |
| D461,476 S | 8/2002 | Evers et al. |
| 6,498,895 B2 | 12/2002 | Young et al. |
| D474,154 S | 5/2003 | Lai |
| D483,373 S | 12/2003 | Huang |
| 6,774,926 B1 | 8/2004 | Ellis et al. |
| D519,465 S | 4/2006 | Sirichai et al. |
| 7,130,846 B2 | 10/2006 | Danker et al. |
| 7,134,133 B1 | 11/2006 | Wugofski |
| D537,036 S | 2/2007 | Chen |
| D547,761 S | 7/2007 | Hui |
| 7,324,857 B2 | 1/2008 | Goddard |
| 7,366,462 B2 | 4/2008 | Chari et al. |
| D575,785 S | 8/2008 | Chang |
| D576,555 S | 9/2008 | Bruseloff |
| 7,426,696 B1 | 9/2008 | Hwang et al. |
| D601,142 S | 9/2009 | Lindley |
| 7,607,153 B2 | 10/2009 | Nishina et al. |
| D604,302 S | 11/2009 | Staal |
| D604,725 S | 11/2009 | Chen |
| D605,650 S | 12/2009 | Ribeiro |
| 7,631,328 B2 | 12/2009 | Clancy et al. |
| 7,664,813 B2 | 2/2010 | Pettit et al. |
| 7,694,319 B1 | 4/2010 | Hassell et al. |
| 7,703,118 B2 | 4/2010 | Hudspeth |
| 7,712,125 B2 | 5/2010 | Herigstad et al. |
| D618,240 S | 6/2010 | Larmour et al. |
| 7,818,769 B2 | 10/2010 | Peacock et al. |
| D627,784 S | 11/2010 | Yamamoto |
| 7,844,989 B2 | 11/2010 | Moon |
| D632,694 S | 2/2011 | Dickhoff et al. |
| 8,006,263 B2 | 8/2011 | Ellis et al. |
| 8,165,598 B2 | 4/2012 | Tran et al. |
| 8,245,257 B1 | 8/2012 | Stettner |
| D672,780 S | 12/2012 | Chen et al. |
| 8,347,333 B1 | 1/2013 | Arsenault et al. |
| D684,976 S | 6/2013 | Akana et al. |
| 8,539,528 B2 | 9/2013 | Klosterman |
| D691,140 S | 10/2013 | Huang |
| 8,595,769 B2 | 11/2013 | Matz |
| 8,661,468 B2 | 2/2014 | Peacock et al. |
| D707,234 S | 6/2014 | Tan |
| D707,680 S | 6/2014 | Akana et al. |
| 8,752,094 B2 | 6/2014 | Kunkel et al. |
| D717,309 S | 11/2014 | Govindarajan |
| D717,747 S | 11/2014 | Nishimoto et al. |
| D721,374 S | 1/2015 | Liu |
| 9,516,252 B2 | 12/2016 | Peacock et al. |
| 11,343,581 B2 | 5/2022 | Peacock et al. |
| 2002/0032751 A1* | 3/2002 | Bharadwaj ............. H04L 67/51 348/E7.071 |
| 2002/0059596 A1 | 5/2002 | Sano et al. |
| 2002/0069407 A1 | 6/2002 | Fagnani et al. |
| 2002/0092024 A1 | 7/2002 | Nagaoka et al. |
| 2002/0100063 A1 | 7/2002 | Herigstad et al. |
| 2002/0151271 A1 | 10/2002 | Tatsuji et al. |
| 2002/0184635 A1 | 12/2002 | Istvan |
| 2003/0030751 A1 | 2/2003 | Lupulescu et al. |
| 2003/0051239 A1 | 3/2003 | Hudspeth |
| 2003/0149978 A1 | 8/2003 | Plotnick |
| 2003/0200001 A1 | 10/2003 | Goddard |
| 2004/0002987 A1 | 1/2004 | Clancy et al. |
| 2004/0031050 A1 | 2/2004 | Klosterman |
| 2004/0221310 A1 | 11/2004 | Herrington et al. |
| 2004/0268250 A1 | 12/2004 | Danker et al. |
| 2005/0022237 A1* | 1/2005 | Nomura ........... H04N 21/47214 725/50 |
| 2005/0101319 A1 | 5/2005 | Murali et al. |
| 2005/0120369 A1 | 6/2005 | Matz |
| 2006/0031883 A1 | 2/2006 | Ellis et al. |
| 2006/0041906 A1 | 2/2006 | Vermola |
| 2006/0062059 A1 | 3/2006 | Smith et al. |
| 2006/0143651 A1 | 6/2006 | Kim |
| 2006/0174268 A1 | 8/2006 | Matero |
| 2006/0174271 A1 | 8/2006 | Chen et al. |
| 2006/0212906 A1 | 9/2006 | Cantalini |
| 2006/0236342 A1 | 10/2006 | Kunkel et al. |
| 2007/0118854 A1 | 5/2007 | Moon |
| 2007/0186243 A1 | 8/2007 | Pettit et al. |
| 2007/0229025 A1 | 10/2007 | Tsai et al. |
| 2007/0255811 A1 | 11/2007 | Pettit et al. |
| 2007/0293079 A1 | 12/2007 | Chao et al. |
| 2007/0300265 A1 | 12/2007 | Karkkainen |
| 2008/0081640 A1 | 4/2008 | Tran et al. |
| 2008/0083001 A1 | 4/2008 | Peacock et al. |
| 2008/0092175 A1 | 4/2008 | Peacock et al. |
| 2010/0095328 A1 | 4/2010 | Hartung et al. |
| 2011/0099585 A1 | 4/2011 | Peacock et al. |
| 2011/0199729 A1 | 8/2011 | Hsieh |
| 2017/0048588 A1 | 2/2017 | Peacock et al. |

OTHER PUBLICATIONS

"U.S. Appl. No. 11/542,620, Non Final Office Action dated Jul. 28, 2009".

"U.S. Appl. No. 11/542,620, Non Final Office Action dated Sep. 10, 2008".

"U.S. Appl. No. 11/542,620, Notice of Allowance dated Jun. 14, 2010".

"U.S. Appl. No. 11/542,620, Pre Appeal Brief Request filed Apr. 7, 2010".

"U.S. Appl. No. 11/542,620, Pre Appeal Brief Request filed May 11, 2009".

"U.S. Appl. No. 11/542,620, Reply Brief mailed Jun. 1, 2009".

"U.S. Appl. No. 11/542,620, Reply Brief mailed Jul. 1, 2009".

"U.S. Appl. No. 11/542,620, Response filed Jan. 8, 2009 to Non Final Office Action dated Sep. 10, 2008".

"U.S. Appl. No. 11/542,620, Response filed Oct. 19, 2009 to Non Final Office Action dated Jul. 28, 2009".

"U.S. Appl. No. 12/882,061, Advisory Action dated May 5, 2015".

"U.S. Appl. No. 12/882,061, Examiner Interview Summary dated Apr. 22, 2016".

(56) References Cited

OTHER PUBLICATIONS

"U.S. Appl. No. 12/882,061, Examiner Interview Summary dated May 5, 2015".
"U.S. Appl. No. 12/882,061, Examiner Interview Summary dated Jul. 14, 2014".
"U.S. Appl. No. 12/882,061, Examiner Interview Summary dated Sep. 7, 2016".
"U.S. Appl. No. 12/882,061, Examiner Interview Summary dated Dec. 12, 2014".
"U.S. Appl. No. 12/882,061, Final Office Action dated Feb. 20, 2015".
"U.S. Appl. No. 12/882,061, Final Office Action dated Mar. 28, 2014".
"U.S. Appl. No. 12/882,061, Non Final Office Action dated Aug. 12, 2013".
"U.S. Appl. No. 12/882,061, Non Final Office Action dated Aug. 27, 2014".
"U.S. Appl. No. 12/882,061, Non Final Office Action dated Dec. 31, 2015".
"U.S. Appl. No. 12/882,061, Notice of Allowance dated Aug. 22, 2016".
"U.S. Appl. No. 11/542,620, Final Office Action mailed Jan. 6, 2010", 25 pgs.
"U.S. Appl. No. 12/882,061, Examiner Interview Summary dated Dec. 12, 2014", 3 pgs.

\* cited by examiner

| Date 301 | | Time 311 | Time 313 | Time 315 |
|---|---|---|---|---|
| Channel 321 | ---------- | | ------------------------- | |
| Channel 323 | ---------- | | ------------------------- | |
| Channel 325 | ---------- | | ------------------------- | |
| Channel 327 | ---------- | | ------------------------- | |
| Channel 329 | ---------- | | ------------------------- | |
| Channel 331 | ---------- | | ------------------------- | |

Figure 3

| Date 401 | | Time 411 | Time 413 | Time 415 |
|---|---|---|---|---|
| Channel 421 | icon 431 | Program 441 | | Program 443 |
| Channel 423 | icon 433 | Program 445 | Program 447 | |
| Channel 425 | icon 435 | Program 451 | | |
| Channel 427 | icon 471 | Program 453 | Program 455 | Program 457 |
| Channel 429 | ---------- | ------------------------- | | |
| Channel 481 | ---------- | ------------------------- | | |

Figure 4

METHODS AND APPARATUS FOR IMPLEMENTING DYNAMIC PROGRAM GUIDES ON MOBILE DEVICES

CROSS-REFERENCE TO RELATED APPLICATIONS

This application is a continuation of U.S. patent application Ser. No. 15/340,917, filed Nov. 1, 2016, which is a continuation of U.S. patent application Ser. No. 12/882,061, filed Sep. 14, 2010, now U.S. Pat. No. 9,516,252, which is a continuation of U.S. patent application Ser. No. 11/542,620, filed Oct. 2, 2006, now U.S. Pat. No. 7,818,769, the disclosures of which are incorporated by reference in their entireties.

BACKGROUND OF THE INVENTION

1. Field of the Invention

The present disclosure relates to program guides on mobile devices. In one example, the present invention relates to methods and apparatus for allowing mobile devices to dynamically and efficiently access program guide information.

2. Description of Related Art

Some mobile devices such as cellular phones have the capability of playing broadcast media streams, such as broadcast video or audio streams. A mobile device user can select a particular channel and receive broadcast media for a selected station. In order to provide a user with a more complete user experience, program guide information including channel, title, and time information can be provided. In some instances, the program guide information is downloaded to a mobile device from a service provider.

However, mechanisms for providing program guide information to mobile devices are limited. In many instances, providing program guide information to a mobile device disrupts a user's experience. Consequently, the techniques of the present invention provide mechanisms for improving the ability of mobile devices to obtain program guide information.

SUMMARY OF THE INVENTION

Mechanisms are provided for allowing a mobile device to dynamically obtain program guide data. A mobile device having the capability of playing media streams is configurable to dynamically request program guide structure information followed by program guide content information. In one example, the program guide structure information allows a user to begin navigating the program guide data in an active and dynamic manner. Program guide content information including data such as program titles, times, icons, and links are then downloaded and displayed as needed. Potentially limitless amounts of program guide data can be provided on a mobile device. Program guide content information can be provided in a generic manner while allowing user layout customization. Program guide information can also be preemptively provided to a mobile device based on a variety of criteria.

In one example, a first request is sent from a mobile device to a server. The first request is associated with program guide structure information. A first response is received from the server. The first response is associated with program guide structure information. The program guide structure information includes lineup data. A second request associated with program guide content information is sent. A second response associated with program guide content information is received. The program guide content information includes multiple program titles.

In another example, a system is described. The system includes an input interface and an output interface. The input interface is operable to receive a first request and a second request from a mobile device. The first request is associated with program guide structure information. The second request is associated with program guide content information. The output interface is operable to send a first response and a second response to the mobile device. The first response is associated with program guide structure information. The program guide structure information includes lineup data. The second response is associated with program guide content information. The program guide content information includes multiple program titles.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings, which illustrate specific embodiments of the present invention.

FIG. 3 is a diagrammatic representation showing a block of a program guide.

FIG. 4 is a diagrammatic representation showing another block of a program guide.

DESCRIPTION OF EXAMPLE EMBODIMENTS

Figure 1:
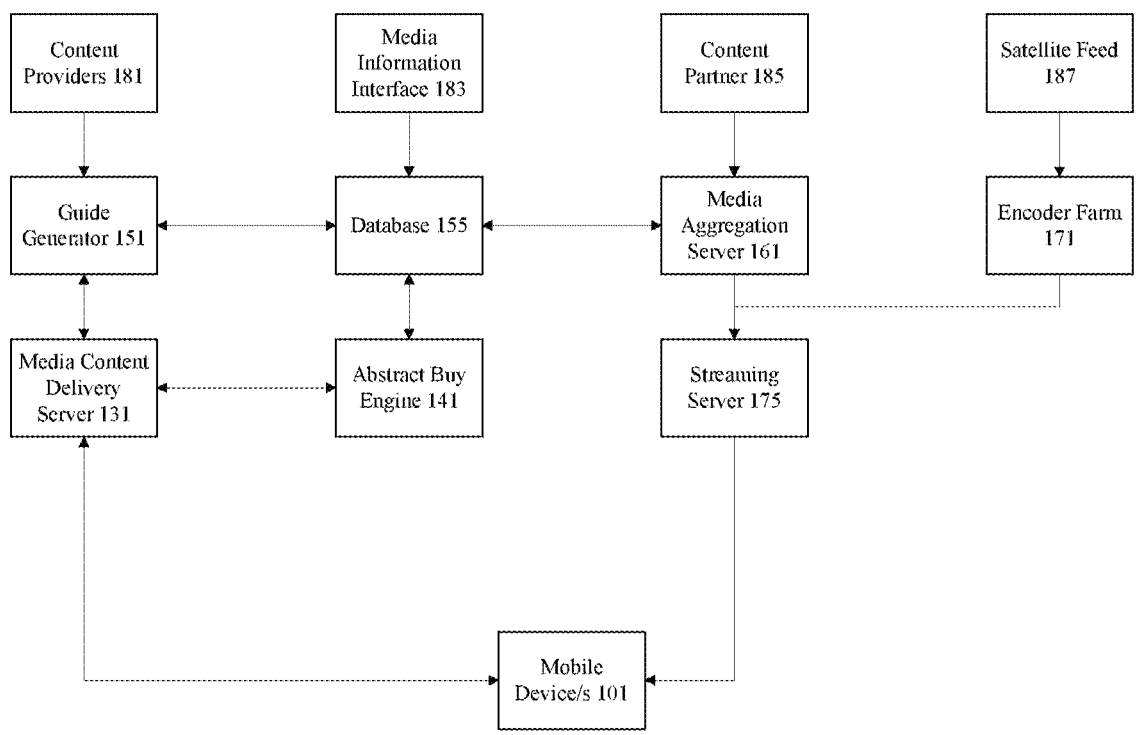
FIG. 1 is a diagrammatic representation showing a network that can use the techniques and mechanisms of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular networks and particular mobile devices. However, it should be noted that the techniques of the present invention can be applied to a variety of different networks and a variety of different mobile devices. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

Providing media streams such as live television or live radio to mobile devices presents a variety of unique and challenging difficulties. For example, cellular service is provided by a significant number of carriers. The carriers have their own set of specifications and run a variety of different protocols on a number of frequency bands to provide cellular service. Each individual carrier may also run different protocols and support a number of separate standards spanning different generations.

The commonality between the different varieties of cellular services and wireless service in general is that bandwidth remains a significant constraint. Each provider has limited spectrum to use for providing wireless service, and despite continuing technological advances, latency constraints in communications over the airwaves in limited spectrum remain significant.

Furthermore, mobile devices are also numerous and diverse. For example, the different cellular providers support a vast array of mobile telephony devices from numerous device makers. Mobile telephony devices differ in processing capabilities, memory capacity, battery life, display size and resolution, sound quality, etc. Furthermore, mobile devices also include personal digital assistants, portable computing devices, and an array of other devices not even associated with particular mobile telephony networks. Delivering media services to these numerous entities would be difficult even if the media originated from a single source. However, media is similarly provided from a diverse base. A large number of media content providers present media data in their own specified formats. Media content may have to be processed using a number of different encoding formats with numerous video and audio codecs both open and proprietary.

Consequently, media content delivery systems are needed to aggregate media data, modify media streams appropriately, and provide the media data and associated information over networks having significantly limited bandwidth to devices with widely varying capabilities. Media can be provided to mobile devices in the form of files or clips or can be provided as a live stream. However, even providing relatively small media files or clips to mobile telephony devices can be overwhelming for conventional wireless networks. Consequently, it is recognized that broadcasting prerecorded or live streams of media data can be cost effective. Mobile devices such as cellular phones can receive live television provided by broadcast media streams. The same streams can be broadcast to numerous mobile devices without having to transmit the same media clips separately to individual users at different times. It should be noted that the techniques of the present invention apply to all broadcast and unicast media streams.

In order to provide the user of a mobile device with a reasonable user experience, it is beneficial to provide the user with program guide information for broadcast media streams. Some available mobile devices are configured to receive up to 20 channels. Consequently, a few hours of program guide data for the 20 channels could be provided to the mobile device and stored temporarily on the mobile device in a fairly effective manner. However, when hundreds or thousands of channels are available to a mobile device, problems can arise. Mobile devices often have limited memory or storage capabilities. Furthermore, bandwidth and latency limitations are pronounced in wireless networks. Consequently, some available implementations download 24 hours of program guide data per channel for thousands of channels in an extremely slow manner. The program guides are provided as large objects and the user must wait for the entire guide to load before anything can be viewed.

Downloading even time limited program guide data for hundreds or thousands of channels would use memory and network resources typically not available for mobile devices. Consequently, the techniques of the present invention allow for the download and display of potentially limitless program guide data. In some examples, just enough program guide structure information is downloaded and displayed to allow a user to navigate a program guide. Any program guide data allowing a user to begin navigating a program guide is referred to herein as program guide structure information. In some examples, program guide structure information is a listing of subscribed channels or a listing of groups of channels. For example, a user can view a table of channels available in a particular geographic area. The mobile device then begins accessing program content information.

Program content information includes details used to complete program guide structure information to create a program guide. In some examples, program content information includes program titles, times, icons, program descriptions, links, graphics, etc. In one example, when a user scrolls to a block of channels or time period, the access is not blocked. Instead, a dynamic request is transmitted for program guide content information corresponding to the user request. Program guide structure information requests remain infrequent because requests for program guide structure information can be dependent on the user and on subscription rights.

The request is database intensive since it has potentially different results for every user. While the user is navigating guide parts, program guide content requests are transmitted. According to various embodiments, program guide content requests are numerous. However, the requests are for generic program guide content that is not dependent on user specific information. The program guide content can be cached and delivered rapidly from cache. Consequently, performance is improved for delivery of program guide data for mobile devices. In other examples, it is contemplated that some program guide content information can be preemptively obtained based on usage patterns. For example, if it is determined that a user typically scrolls down, program guide content for channels seen when scrolling down are preemptively downloaded.

FIG. 1 is a diagrammatic representation showing one example of a network that can use the techniques of the present invention. According to various embodiments, media content is provided from a number of different sources 185. Media content may be provided from film libraries, cable companies, movie and television studios, commercial and business users, etc. and maintained at a media aggregation server 161. Any mechanism for obtaining media content from a large number of sources in order to provide the media content to mobile devices in live broadcast streams is referred to herein as a media content aggregation server. The media content aggregation server 161 may be clusters of servers located in different data centers. According to various embodiments, content provided to a media aggregation server 161 is provided in a variety of different encoding formats with numerous video and audio codecs. Media content may also be provided via satellite feed 157.

An encoder farm 171 is associated with the satellite feed 187 and can also be associated with media aggregation server 161. The encoder farm 171 can be used to process media content from satellite feed 187 as well as possibly from media aggregation server 161 into potentially numerous encoding formats. According to various embodiments, file formats include open standards MPEG-1 (ISO/IEC 11172), MPEG-2 (ISO/IEC 13818-2), MPEG-4 (ISO/IEC 14496), as well as proprietary formats QuickTime™, ActiveMovie™, and RealVideo™. Some example video codecs used to encode the files include MPEG-4, H.263, and H.264. Some example audio codecs include Qualcomm Purevoice™ (QCELP), The Adaptive Multi-Narrow Band (AMR-NB), Advanced Audio coding (AAC), and AACPlus. The media content may also be encoded to support a variety of data rates. The media content from media aggregation server 161 and encoder farm 171 is provided as live media to a streaming server 175. In one example, the streaming server is a Real Time Streaming Protocol (RTSP) server 175. Media streams are broadcast live from an RTSP server 175 to individual client devices 101. A variety of protocols can be used to send data to client devices.

Possible client devices 101 include personal digital assistants (PDAs), cellular phones, personal computing devices, etc. According to various embodiments, the client devices are connected to a cellular network run by a cellular service provider. Cell towers typically provide service in different areas. Alternatively, the client device can be connected to a wireless local area network (WLAN) or some other wireless network. Live media streams provided over RTSP are carried and/or encapsulated on one of a variety of wireless networks.

The client devices are also connected over a wireless network to a media content delivery server 131. The media content delivery server 131 is configured to allow a client device 101 to perform functions associated with accessing live media streams. For example, the media content delivery server allows a user to create an account, perform session identifier assignment, subscribe to various channels, log on, access program guide information, obtain information about media content, etc. According to various embodiments, the media content delivery server does not deliver the actual media stream, but merely provides mechanisms for performing operations associated with accessing media. In other implementations, it is possible that the media content delivery server also provides media clips, files, and streams. The media content delivery server is associated with a guide generator 151. The guide generator 151 obtains information from disparate sources including content providers 181 and media information sources 183. The guide generator 151 provides program guides to database 155 as well as to media content delivery server 131 to provide to mobile devices 101. The media content delivery server 131 is also associated with an abstract buy engine 141. The abstract buy engine 141 maintains subscription information associated with various client devices 101. For example, the abstract buy engine 141 tracks purchases of premium packages.

The media content delivery server 131 and the client devices 101 communicate using requests and responses. For example, the client device 101 can send a request to media content delivery server 131 for a subscription to premium content. According to various embodiments, the abstract buy engine 141 tracks the subscription request and the media content delivery server 131 provides a key to the client 101 to allow it to decode live streamed media content. According to various embodiments, all client devices 101 have access to media content broadcast over the airwaves. However, only client devices 101 authorized by a media content delivery server 131 can actually display certain media content. Similarly, the client device 101 can send a request to a media content delivery server 131 for a program guide for its particular program package. The media content delivery server 131 obtains the guide data from the guide generator 151 and associated database 155 and provides appropriate guide information to the client device 101.

Although the various devices such as the guide generator 151, database 155, media aggregation server 161, etc. are shown as separate entities, it should be appreciated that various devices may be incorporated onto a single server. Alternatively, each device may be embodied in multiple servers or clusters of servers. According to various embodiments, the guide generator 151, database 155, media aggregation server 161, encoder farm 171, media content delivery server 131, abstract buy engine 141, and streaming server 175 are included in an entity referred to herein as a media content delivery system.

Figure 2:
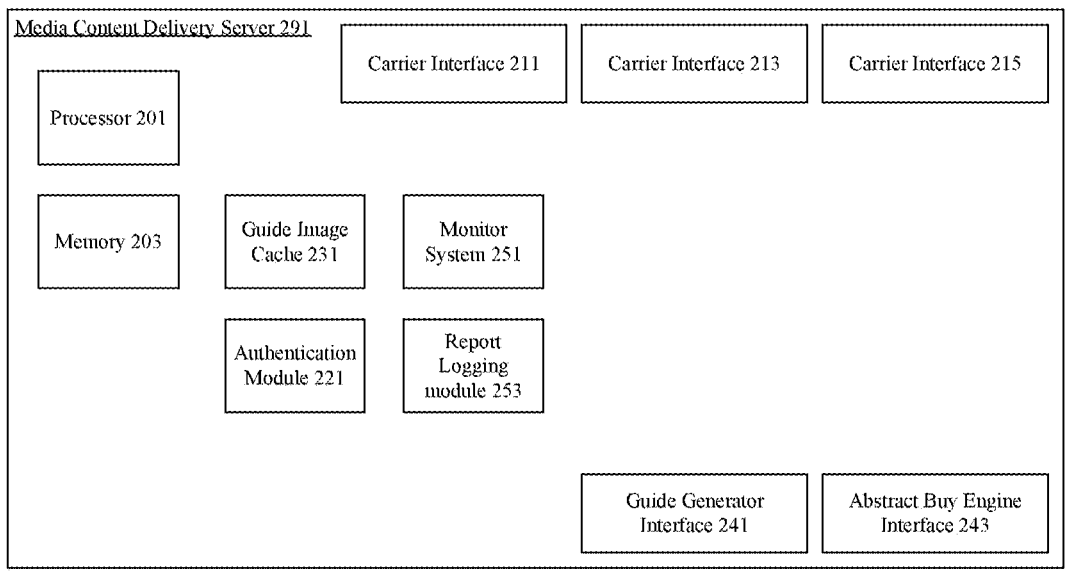
FIG. 2 is a diagrammatic representation depicting a content delivery system.

FIG. 2 is a diagrammatic representation showing one example of a media content delivery server 291. According to various embodiments, the media content delivery server 291 includes a processor 201, memory 203, and a number of interfaces. In some examples, the interfaces include a guide generator interface 241 allowing the media content delivery server 291 to obtain program guide information. The media content delivery server 291 also can include a program guide cache 231 configured to store program guide information and data associated with various channels. The media content delivery server 291 can also maintain static information such as icons and menu pages. The interfaces also include a carrier interface 211 allowing operation with mobile devices such as cellular phones operating in a particular cellular network. The carrier interface allows a carrier vending system to update subscriptions. Carrier interfaces 213 and 215 allow operation with mobile devices operating in other wireless networks. An abstract buy engine interface 243 provides communication with an abstract buy engine that maintains subscription information.

An authentication module 221 verifies the identity of mobile devices. A logging and report generation module 253 tracks mobile device requests and associated responses. A monitor system 251 allows an administrator to view usage patterns and system availability. According to various embodiments, the media content delivery server 291 handles requests and responses for media content related transactions while a separate streaming server provides the actual media streams. Media streams are broadcast to mobile devices, but mobile devices are not configured to access and a user is not able to view media content unless appropriate authorizations are made through a media content delivery server 291. In some instances, a media content delivery server 291 may also have access to a streaming server or operate as a proxy for a streaming server. But in other instances, a media content delivery server 291 does not need to have any interface to a streaming server. In typical instances, however, the media content delivery server 291 also provides some media streams. The media content delivery server 291 can also be configured to provide media clips and files to a user in a manner that supplements a streaming server.

Although a particular media content delivery server 291 is described, it should be recognized that a variety of alternative configurations are possible. For example, some modules such as a report and logging module 253 and a monitor 251 may not be needed on every server. Alternatively, the modules may be implemented on another device connected to the server. In another example, the server 291 may not include an interface to an abstract buy engine and may in fact include the abstract buy engine itself. A variety of configurations are possible.

FIG. 3 is an exchange diagram depicting one example of program guide structure information. In some examples, the times 311, 313, and 315 cover a time range from time 311 through time 315, such as 3 pm to 5 pm. According to various embodiments, a date 301 is provided. The program guide structure information provides information identifying channels 321, 323, 325, 327, 329, and 331. In some examples, program guide structure information includes a table of hundreds of channels. A program guide can be created by a guide generator from information provided by a variety of content providers. The program guide structure information may include a listing of channels and not program guide content information for hundreds or thousands of channels.

Available systems download program guide information for all available channels or substantially all subscribed channels. In many instances, an entire program guide is downloaded. Downloading an entire program guide can take an unreasonably long period time, use considerable bandwidth, and consume resources on a device. For mobile devices with media capabilities operating in wireless networks, it is contemplated that it is beneficial to download program guide structure to allow a user to begin navigating while downloading program guide content dynamically based on demand from a user. In some examples, program guide content is downloaded in blocks.

The program guide content block size may be determined based on the size of available mobile device memory. In another alternative, a program guide information block size is based upon data transmission rates, server cache block sizes, or available bandwidth. A wide variety of criteria and combinations of criteria can be used in determining a program guide information block size. In other examples, just enough data is downloaded to display a list and allow a user to begin to navigate the program guide information. As the user views different parts of the guide, the detailed content of the guide is downloaded separately and displayed as needed. There is no need to download the entire guide. Only what the user needs to view is downloaded on demand. Potentially limitless guide data can be downloaded in this manner. Even weeks or months of data can be obtained. The user gets immediate feedback and does not need to wait for the data. The guide is not limited to the memory storage on the device or the service bandwidth. Guide data can be constantly updated since only the visible portion needs to be downloaded.

FIG. 4 depicts program guide structure information and program guide content information. In one example, program guide structure such as a listing of channels or at least a partial listing of channels is initially downloaded to allow a user to begin navigating. The block of program guide content information is associated with date 401 and times 411, 413, and 415. In another example, the times 411, 413, and 415 cover a time range from time 411 through time 415, such as 3 pm to 5 pm. Programs 441, 443, 445, 447, 451, 453, 455, and 457 are included in the program guide information block. In particular examples, icons 431, 433, 435, and 471 are provided. The program guide information block shows program guide information for channels 421, 423, 425, 427, 429, and 481. In some examples, a program guide includes information for hundreds of channels. A program guide can be created by a guide generator from information provided by a variety of content providers. Program guide structure information can be unique to each user. Program guide content information is maintained in relatively generic form and can be cached on a server.

In some examples program guide content information only provides information for channels 421, 423, 425, and 427 and not for hundreds or thousands of other channels. A mobile device screen may only be sufficient to display a portion of the program guide information block. For example, the mobile device screen may only show information for channels 421, 423, and 425. Nonetheless, some extra information may be downloaded in anticipation of a user requesting that information. Although the channels shown are contiguous, it should be noted that channels and times as well do not have to be contiguous.

In some examples, a media content delivery server can remember channels or groups of channels frequently accessed by a user and provide the channels or groups of channels as part of a block of program guide information. In another example, a media content delivery server can recognize that users often scrolls down on a program guide and provide several pages of scroll down program guide information to a user preemptively even before the user performs any scrolling. In still other examples, a media content delivery server can recognize user viewing or listening patterns and download blocks of program guide content information believed to be of interest to a user. Similarly, a media content delivery server can determine times when media is frequently accessed and provide blocks of program guide information based on viewing times. A wide variety of algorithms can be implemented to intelligently select portions of program guide content information for download to a mobile device without having to download the entire program guide. Resources can be conserved while still providing the user with an active and dynamic experience.

Figure 5:
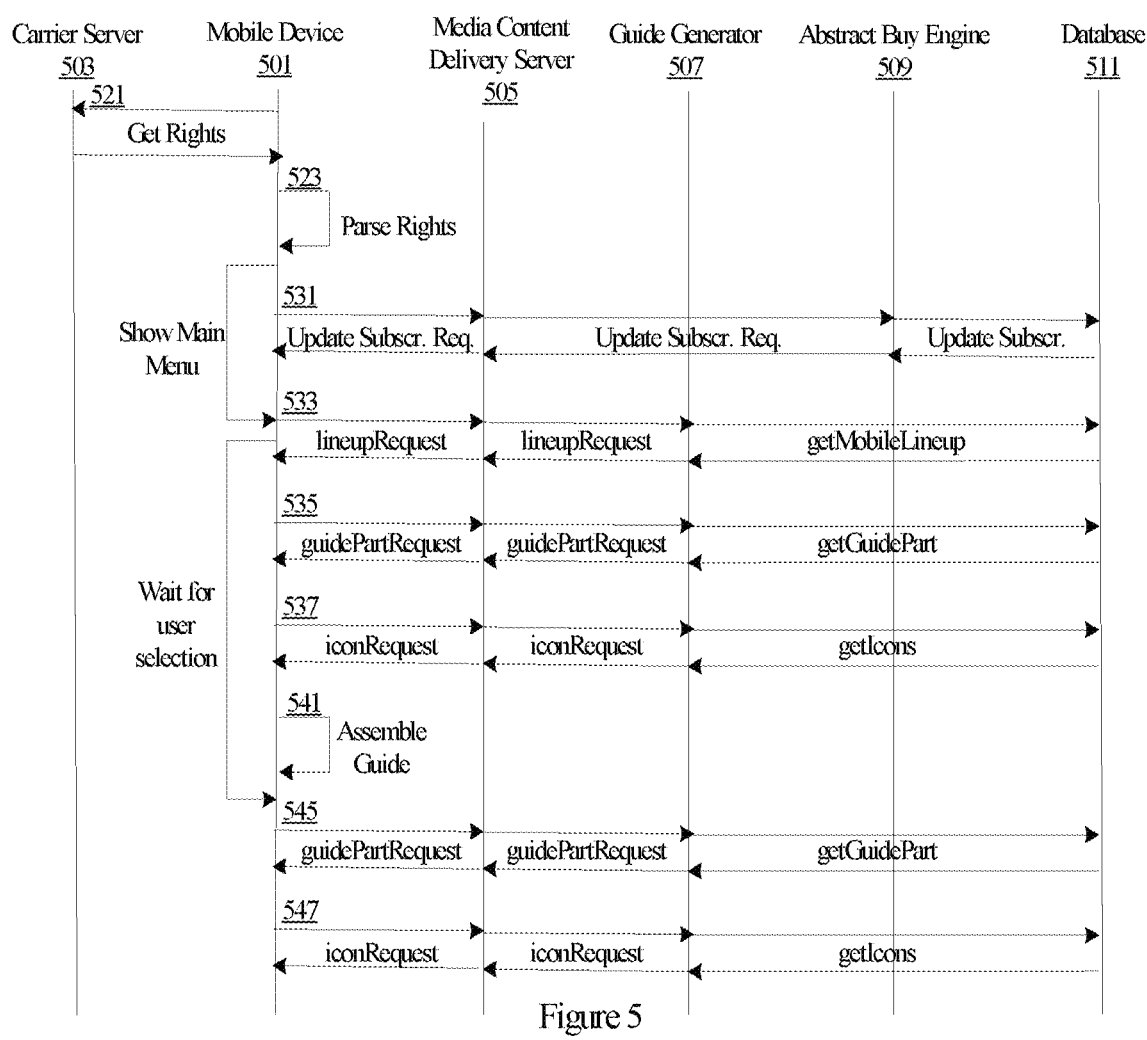
FIG. 5 is an exchange diagram showing a guide request sequence.

FIG. 5 is an exchange diagram showing one example of a mobile guide delivery sequence. A mobile device 501 obtains subscription service rights information from a carrier server 503 at 521. According to various embodiments, the mobile device parses and displays information associated with the rights at 523. In one example, a root menu showing subscribed and available channels is shown.

According to various embodiments, the mobile device 501 sends an update subscriptions request message at 531 to a media content delivery server 505. The media content delivery server 505 forwards the update subscriptions request message to an abstract buy engine 509. The abstract buy engine 509 sends an update subscriptions message to the database 511. The mobile device 501 also sends a lineup request message 533 to the media content delivery server 505. The lineup request message is forwarded to a guide generator 507. The guide generator obtains a lineup for the mobile device from the database 511. The abstract buy engine 509 is not involved in this particular request transaction. At 535, the mobile device sends a guide part request to the media content delivery server 505. In some examples, the request is a request for the entire program guide. In typical examples, the request is a request for a portion of the guide or a program guide information block. The program guide information block request is forwarded to a guide generator 507. The guide generator obtains the guide part from a database 511 or generates it based on other information.

In some examples, icons are also requested by the mobile device 501 at 537. The mobile device 501 sends an icon request to the media content delivery server 505. The media content delivery server 505 forwards the icon request to the guide generator 507. The guide generator obtains icons from the database 511. According to various embodiments, other information such as advertisements and media clips are also requested or provided along with the icons. At 541, the guide is assembled at the mobile device 501. The user can then scroll through the guide or jump to a particular location in the guide. Some portions of the guide may not yet be downloaded. Consequently, additional guide part requests and icon requests may be sent by a mobile device 501 at 545 and 547. The additional program guide information block requests and icon requests at 545 and 547 may be sent for different channels, different channel blocks, or different time periods.

Figure 6:
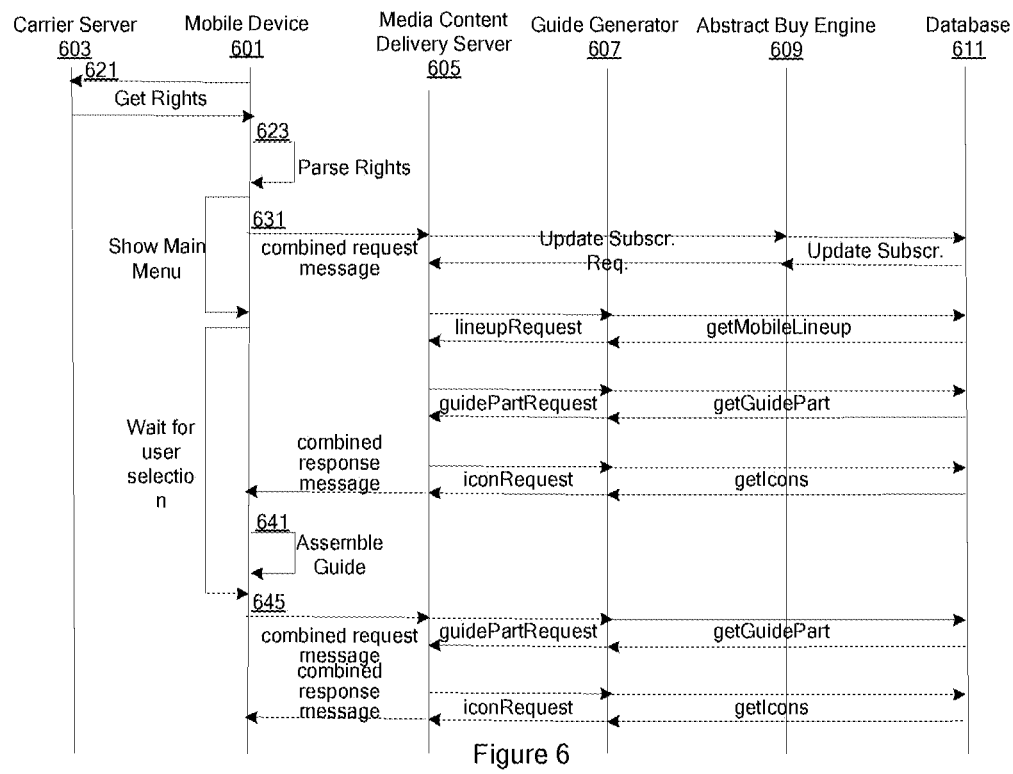
FIG. 6 is a flow process diagram showing mobile device processing.

FIG. 6 is an exchange diagram showing one example of a mobile guide delivery sequence where multiple requests are included in a request message. A mobile device 601 obtains descriptor information from a carrier server 603 at 621. In one example, descriptor information is subscription service information. The subscription service information provides subscription and menu information to the mobile device 601. According to various embodiments, the mobile device parses and displays information associated with the rights at 623. In one example, a root menu showing subscribed and available channels is shown.

According to various embodiments, the mobile device 601 sends an update subscriptions request message at 631 to a media content delivery server 605. The update subscriptions request message also includes a lineup request, a guide part request, and an icon request.

To improve efficiency, it is possible to reduce the total number of round trips between a mobile device 601 and a media content delivery server 605. Therefore, it is beneficial to batch together many of these mobile device 601 requests into a single message 631 sent to the media content delivery server 605. The server responses can similarly be sent as a single message back to the mobile device 601. In one example, the following XML code could used to batch requests into a single request message:

```
<mobiTalkRequest version="1.0" haltOnFailure="true">
    <request>
        <updateSubscriptionsRequest userId="xyz">
        </updateSubscriptionsRequest>
    </request>
    <request>
        <iconRequest userId="xyz" iconIdList="74,23" />
    </request>
    <request>
        <lineupDetailRequest idList="74,23,101" ... />
    </request>
</mobiTalkRequest>
```

According to various embodiments, it is also possible to increase the number of requests that can be included in a single message by allowing results from early requests in the batch to make their way as inputs into the later requests in the message. For example, the following batch includes a newAccountRequest which creates a new "userId" and a lineupRequest which takes "userId" as an argument:

```
<mobiTalkRequest version="1.0" haltOnFailure="true">
    <request>
        <newAccountRequest vendorUserId="abc" vid="FOO-BAR" ... />
    </request>
    <request>
        <lineupRequest userId="{USERID}" guideType="mobile" ... />
    </request>
</mobiTalkRequest>
```

The name of intermediate results such as "USERID" in the above example can be well-known from the protocol documentation, or can be explicitly named in the protocol, such as:

```
<mobiTalkRequest version="1.0" haltOnFailure="true">
    <request>
        <newAccountRequest vid="FOO-BAR"
            userIdResultName="USERID"
            customerNumResultName="CUSTNUM" ... />
    </request>
    <request>
        <lineupRequest userId="{USERID}" guideType="mobile" ... />
    </request>
</mobiTalkRequest>
```

According to various embodiments, these intermediate results can be implemented on the server by an associative array with names and values that get filled in during the processing of the batch. In some example, before processing any request in the batch, the server replaces all intermediate result names in that request (such as "{USERID}" above) with the corresponding value computed earlier in the batch and stored in the associative array.

The media content delivery server 605 extracts the requests from the request message received from the mobile device 601. The media content delivery server 605 forwards the update subscriptions request message to an abstract buy engine 609. The abstract buy engine 609 sends an update subscriptions message to the database 611. The lineup request message is forwarded to a guide generator 607. The guide generator obtains a lineup for the mobile device from the database 611. At 635, the mobile device sends a guide part request to the media content delivery server 605. In some examples, the request is a request for the entire program guide. In typical examples, the request is a request for a portion of the guide. The guide part request is forwarded to a guide generator 607. The guide generator obtains the guide part from a database 611. The mobile device 601 sends an icon request to the media content delivery server 605. The media content delivery server 605 forwards the icon request to the guide generator 607. The guide generator obtains icons from the database 611. According to various embodiments, other information such as advertisements and media clips are also requested or provided along with the icons. A single response is sent from the media content delivery server 605 to the mobile device 601.

At 641, the guide is assembled at the mobile device 601. The user can then scroll through the guide or jump to a particular location in the guide. Some portions of the guide may not yet be downloaded. Consequently, additional guide part requests and icon requests may be sent by a mobile device 601 at 645 in batched format. The additional requests at 645 may be sent for a different block of channels or a different time period.

Figure 7:
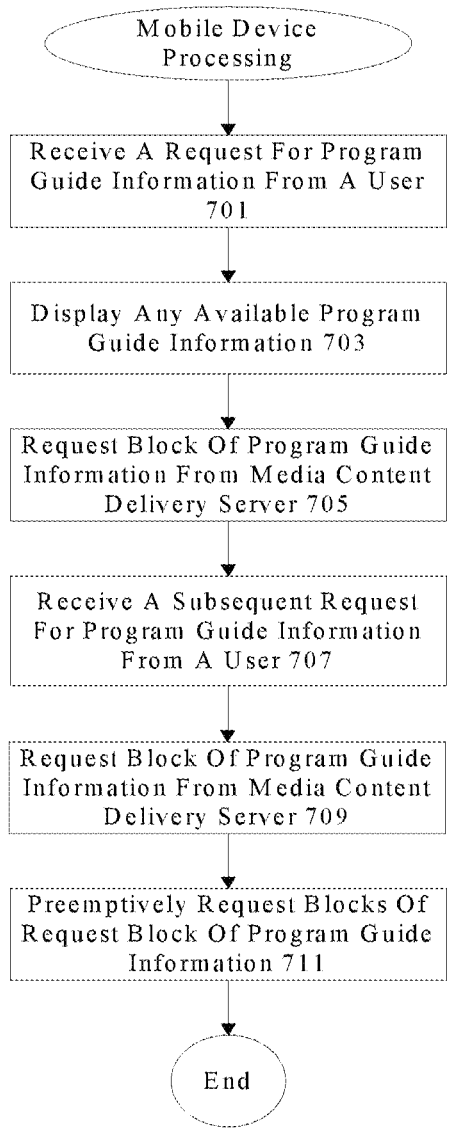
FIG. 7 is a flow process diagram showing server processing.

FIG. 7 is a flow process diagram showing one example of a request for program guide information. At 701, a request for program guide information is received from a user. The request may result from a user selection to view a certain portion of a program guide. According to various embodiments, some program guide information may already be available on the device. For example, a listing of channels may be available. At 703, any program guide information available is displayed. At 705, a mobile device requests a block of program guide information from a media content delivery server. The block of program guide information may have a size determined by the screen of a mobile device. Alternatively, the block of program guide information may have a size determined by the amount of memory available on the mobile device. Other considerations such as bandwidth availability can also be taken into account. At 707, a mobile device receives a subsequent request from a user for program guide information.

According to various embodiments, the subsequent request results from a user scrolling, jumping, or otherwise navigating to a particular portion of a program guide. If the mobile device does not already have the information, the block of program guide information is requested from a media content delivery server at 709. It should be noted that program guide information can also be requested from other entities related to media content delivery servers. At 711, blocks of program guide information can be preemptively requested. Alternatively, blocks of program guide information can be preemptively provided to a mobile device. A variety of mobile devices can be used. According to various embodiments, a mobile device includes a display, a processor, memory, an interface operable to communicate with a media content delivery server, and an input interface operable to allow a user to operate the device. Possible mobile devices include cellular phones, personal digital assistants, portable computing devices, etc.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method comprising:
   sending a program guide structure information to a mobile device before streaming content information is received;
   generating for display a navigable program guide based solely on the program guide structure information before the streaming content information is received;
   generating for display navigable content of the navigable program guide before the streaming content information is received;
   receiving a streaming content information request from the mobile device;
   accessing and updating a subscription associated with the mobile device;
   sending a streaming content information response to the mobile device including information based on the subscription associated with the mobile device, wherein the streaming content information response includes full guide information configured for display within the program guide structure information;
   identifying a result of the streaming content information request from the mobile device; and
   inputting the result of the streaming content information request into another streaming content information request wherein the another streaming content information request includes a subscription update request, a guide part request, a content lineup request, and an icon request.

2. The method of claim 1, wherein the streaming content information request includes at least one of a subscription update request, a content lineup request, a guide part request, and an icon request.

3. The method of claim 1, further comprising:
   preemptively sending the full guide information configured for display within the program guide structure information.

4. The method of claim 3, wherein the preemptively sending the full guide information configured for display within the program guide structure information is based on a usage pattern.

5. The method of claim 3, wherein the preemptively sending the full guide information configured for display within the program guide structure information occurs before receipt of a command to navigate the program guide structure information.

6. The method of claim 3, wherein the preemptively sending the full guide information configured for display within the program guide structure information includes determining content likely to be of interest to a user.

7. The method of claim 1, wherein the navigable program guide based solely on the program guide structure information includes a date field, a time field, a channel field, and a content field.

8. The method of claim 7, wherein the content field includes an icon field and a program information field.

9. A system comprising:
   control circuitry configured to:
      send a program guide structure information to a mobile device before streaming content information is received;
      generate for display a navigable program guide based solely on the program guide structure information before the streaming content information is received;
      generate for display navigable content of the navigable program guide before streaming content information is received;
      receive a streaming content information request from the mobile device;
      access and update a subscription associated with the mobile device;
      send a streaming content information response to the mobile device including information based on the subscription associated with the mobile device, wherein the streaming content information response includes full guide information configured for display within the program guide structure information;
      identify a result of the streaming content information request from the mobile device; and
      input the result of the streaming content information request into another streaming content information request wherein the another streaming content information request includes a subscription update request, a guide part request, a content lineup request, and an icon request.

10. The system of claim 9, wherein the streaming content information request includes at least one of a subscription update request, a content lineup request, a guide part request, and an icon request.

11. The system of claim 9, the control circuitry further configured to:

preemptively send the full guide information configured for display within the program guide structure information.

12. The system of claim 11, wherein the control circuitry configured to preemptively send the full guide information configured for display within the program guide structure information is based on a usage pattern.

13. The system of claim 12, wherein the control circuitry configured to preemptively send the full guide information configured for display within the program guide structure information is configured to send the information before receipt of a command to navigate the program guide structure information.

14. The system of claim 12, wherein the control circuitry configured to preemptively send the full guide information configured for display within the program guide structure information includes control circuitry configured to determine content likely to be of interest to a user.

15. The system of claim 9, wherein the navigable program guide based solely on the program guide structure information includes a date field, a time field, a channel field, and a content field.

16. The system of claim 15, wherein the content field includes an icon field and a program information field.

* * * * *